Patented Sept. 25, 1945

2,385,697

UNITED STATES PATENT OFFICE 2,385,697

LUBRICATING OIL COMPOSITION

Marcellus T. Flaxman, Inglewood, Calif., assignor to Union Oil Company of California, Los Angeles, Calif., a corporation of California No Drawing. Application March 14, 1942,
Serial No. 434,632

10 Claims. (Cl. 252—59)

This invention relates to the production of a lubricating oil composition. More specifically this invention relates to low viscosity lubricants which are useful for low temperature operations, such as those encountered in hydraulic systems.

I have discovered that lubricating oils can be prepared from hydrocarbon fractions which normally possess no inherent lubricating oil qualities by the use of certain additive agents. The oil produced according to the teachings herein is especially suitable for use in hydraulic systems where extremely low temperatures are often encountered which may range as low as $-50°$ F. or lower.

The particular hydrocarbon stock which I employ is obtained by reacting an isoparaffin with an olefin in the presence of a catalyst such as concentrated sulphuric acid, sulfonic acid or hydrofluoric acid. A specific example of preparing the hydrocarbon stock which I employ in my new composition of matter is prepared as follows:

Into a vessel equipped with an agitating device there is introduced five parts of a low boiling isoparaffin such as isobutane. Into the same vessel there is also introduced five parts of concentrated sulphuric acid of about 98% $H_2SO_4$. While agitating the sulphur acid and low boiling isoparaffin in the agitator at a temperature of about 60° F. there is slowly added one part of an olefin mixture consisting essentially of butenes and pentenes. After thoroughly agitating the mixture of sulphuric acid, isoparaffins and olefins for a period of three hours the mixture is allowed to settle and the hydrocarbon phase is decanted away from the acid phase. The hydrocarbon phase is placed in a still and all of the materials contained in this phase boiling up to 475° F. or higher, depending upon the final viscosity desired, are removed. The proportion of high boiling materials is materially influenced by the nature of the stocks and the temperature used, a temperature somewhat lower than 60° F. often favors the production of higher boiling materials.

If the distillation is stopped so as to produce a product having a viscosity of approximately 38 Saybolt Universal seconds the distillation bottoms will have the following characteristics:

| | |
|---|---:|
| Boiling range °F | 450 to 600 |
| Gravity | 43.0 |
| Flash C. O. C °F | 210 |
| Fire °F | 240 |
| Pour point, fluid at °F | $-75$ |
| Viscosity, S. U. seconds: | |
| 100° F | 38.1 |
| 130° F | 34.7 |
| Viscosity index | <0 |
| Viscosity gravity constant | 0.800 |

This product is only meant to be illustrative of the distillation bottoms which I may employ since I may also employ products of this type having a viscosity range (Saybolt Universal at 100° F.) between 32 and 75 seconds.

The viscosity gravity constant of an oil has been discussed by Hill and Coats in the Industrial Engineering Chemistry, vol. 20, June, 1928, pages 641–644. The chart used in determining the relationship is described in the Analytical Edition of the Journal of Industrial Engineering Chemistry, page 144, April 15, 1931.

Viscosity temperature constants have also been discussed by Dean and Davis in Chemical and Metallurgical Engineering, vol. 36, October, 1929, pages 618–619.

The distillation bottoms have a clear light yellow color, mild odor, a very low pour point and a very low viscosity gravity constant. These bottoms also possess a relatively low viscosity index. Furthermore, this material has been found to have very little swelling effect upon many types of synthetic rubbers now employed. This product possesses substantially no lubricating qualities.

To the distillation bottoms obtained from the alkylation reaction, described above, I add a small quantity (.01% to 0.1%) of an organic acid, such as the oil soluble acids produced by oxidizing petroleum fractions such as gas oil or lubricating oil by any of the methods described in the prior art as for example the method set forth in U. S. Patent No. 1,690,768. Furthermore, I may add oil soluble fatty acids or naphthenic acids in the amounts specified above for the acids produced by oxidizing petroleum. These acids are all oil soluble monocarboxylic organic acids.

The fatty acids which I find to be especially valuable are oleic acid and lauric acid.

Naphthenic acids are especially suitable for use with the alkylated hydrocarbon stock for the production of my new oil. Furthermore, I find that naphthenic acids having a molecular weight within the range of 300 and 400 and an acid number in the order of 140 to 150 and specifically around 145 are especially suitable as additives for the alkylated hydrocarbon used as the base stock for my new oil. When these foregoing naphthenic acids are added to the alkylated hydrocarbon in an amount ranging from .01% to 0.1% a product is obtained which has superior lubricating qualities for certain purposes. These naphthenic acids are obtained from most Pacific Coast crude oils. Caustic waste liquors obtained during the treatment of kerosene, gas oil and lubricating oil with caustic soda contain varying quantities of naphthenic acids in the form of sodium soaps. By adding a strong mineral acid to these waste liquors these acids are liberated and rise to the top of the waste caustic liquor. These liberated naphthenic acids are separated from the waste caustic liquor by ordinary decantation. The naphthenic acids are placed in a still and subjected to fractionation. During this fractionation the naphthenic acids which I prefer to employ are recovered as a distillation bottoms fraction. This bottom fraction has an acid number of around 140 to 150 and preferably around 145.

This oil may be further improved for low temperature operation by the addition of certain polymers now sold on the market which are produced by polymerizing low boiling olefins, particularly isobutylene in the presence of catalysts, such as aluminum chloride or boron trifluoride. These polymers have molecular weights in the order of from 10,000 to 100,000 and even higher and are described in the Industrial Engineering Chemistry, 32 (1940), page 299, by Thomas and others. The amount of this polymer which I add ranges between 2% and 5%.

An example of an oil produced according to my invention has the following composition:

| | Per cent by weight |
|---|---|
| Alkylation distillation bottoms | 98.35 |
| Naphthenic acids | 0.05 |
| Polymer | 1.60 |
| Total | 100.00 |

The above oil will then have the following characteristics:

| | |
|---|---|
| Gravity, °API at 60° F | 41.7 |
| Flash, C. O. C. °F | 210 |
| Fire, °F | 225 |
| Pour, °F., flows at | −75 |
| Viscosity, Saybolt Universal: | |
| 100° F. secs | 52.5 |
| 130° F. secs | 43.9 |
| Viscosity index (estimated) | 155 |
| Viscosity gravity constant | 0.785 |

The above description of my invention is not to be understood as limiting but only as illustrative of the invention, as many variations may be made within the scope of the following claims.

I claim:

1. A lubricating oil comprising an isoparaffinic hydrocarbon fraction obtained by reacting an olefin with an isoparaffin in the presence of alkylation catalyst and having a Saybolt Universal viscosity at 100° F. between about 32 and 75 seconds, and possessing substantially no lubricity blended with an amount of an oil soluble monocarboxylic organic acid sufficient to impart lubricity to said isoparaffinic hydrocarbon fraction.

2. A lubricating oil comprising an isoparaffinic hydrocarbon fraction obtained by reacting an olefin with an isoparaffin in the presence of alkylation catalyst and having a Saybolt Universal viscosity at 100° F. between about 32 and 75 seconds, and possessing substantially no lubricity blended with .01% to 0.1% of high boiling naphthenic acids.

3. A lubricating oil comprising an isoparaffinic hydrocarbon fraction obtained by reacting an olefin with an isoparaffin in the presence of alkylation catalyst and having a Saybolt Universal viscosity at 100° F. between about 32 and 75 seconds, and possessing substantially no lubricity blended with .01% to 0.1% of naphthenic acids having an acid number between 140 and 150.

4. A lubricating oil comprising an isoparaffinic hydrocarbon fraction obtained by reacting an olefin with an isoparaffin in the presence of alkylation catalyst and having a Saybolt Universal viscosity at 100° F. between about 32 and 75 seconds, and possessing substantially no lubricity blended with 0.01% to 0.1% of naphthenic acids recovered as a bottoms fraction in the distillation of crude naphthenic acids, said bottoms having an acid number between 140 and 150.

5. A lubricating oil comprising an isoparaffinic hydrocarbon fraction obtained by reacting an olefin with an isoparaffin in the presence of alkylation catalyst and having a Saybolt Universal viscosity at 100° F. between about 32 and 75 seconds, and possessing substantially no lubricity blended with between about 0.01% and 0.1% by weight of naphthenic acids having an acid number between 140 and 150 and with a small quantity not exceeding about 5% of a polymer of low boiling olefins, said polymer having a molecular weight greater than about 10,000.

6. A lubricating oil comprising an isoparaffinic hydrocarbon fraction obtained by reacting an olefin with an isoparaffin, said fraction having a Saybolt Universal viscosity at 100° F. between about 32 and 75 seconds, and possessing substantially no lubricating qualities, blended with an amount of a high molecular weight naphthenic acid sufficient to impart lubricity to said bottoms.

7. A lubricating oil comprising a blend of a major proportion of an isoparaffinic hydrocarbon obtained by reacting an olefin with an isoparaffin in the presence of alkylation catalyst and having a Saybolt Universal viscosity at 100° F. of from 32 to 75 seconds and a boiling range of approximately 450° F. to 600° F. within the order of from 0.01% to 0.1% by weight of high boiling naphthenic acids.

8. A lubricating oil comprising a blend of a major proportion of distillation bottoms obtained by reacting an olefin with an isoparaffin in the presence of an alkylation catalyst and distilling the reaction product to produce said distillation bottoms, said distillation bottoms having a Saybolt Universal viscosity at 100° F. of approximately 32 to 75 seconds, a viscosity index of less than zero and having substantially no lubricating qualities, within the order of from 0.01% to 0.1% by weight of naphthenic acids having an acid number in the order of from 140 to 150 and with from approximately 2% to 5% by weight of a butylene polymer having a molecular weight in the order of from 10,000 to 100,000, said lubricating oil having a substantially higher viscosity and viscosity index than said distillation bottoms.

9. A lubricating oil comprising a blend of a major proportion of an isoparaffinic hydrocarbon fraction obtained as a distillation bottoms from the product obtained by reacting an olefin with an isoparaffin, said isoparaffinic hydrocarbon fraction having a Saybolt Universal viscosity at 100° F. of approximately 38 seconds, a viscosity index of less than zero and a boiling range of from 450° to 600° F. and having substantially no lubricating qualities, with approximately 0.05% by weight of naphthenic acids having an acid number in the order of from 140 to 150 and with approximately 1.60% by weight of a butylene polymer having a molecular weight in the order of from 10,000 to 100,000, said lubricating oil having a Saybolt Universal viscosity at 100°

F. of approximately 52.5 seconds and a viscosity index of approximately 155.

10. A lubricating oil comprising an isoparaffinic hydrocarbon fraction obtained by reacting an olefin with an isoparaffin in the presence of alkylation catalyst and having a Saybolt Universal viscosity at 100° F. between about 32 and 75 seconds, and possessing substantially no lubricity blended with an amount of oil soluble organic acid selected from the class of oil soluble organic acids consisting of naphthenic acids, fatty acids and acids produced by oxidizing hydrocarbon fractions, sufficient to impart lubricity to said isoparaffinic hydrocarbon fraction.

MARCELLUS T. FLAXMAN.